US009196161B2

(12) United States Patent
Lai et al.

(10) Patent No.: US 9,196,161 B2
(45) Date of Patent: Nov. 24, 2015

(54) METHOD OF GUIDING PARKING SPACE AND RELATED DEVICE

(71) Applicant: Wistron Corporation, New Taipei (TW)

(72) Inventors: Cheng-Chia Lai, New Taipei (TW); Chih-Hua Lin, New Taipei (TW); Sheng-Hung Hsieh, New Taipei (TW); Chin-En Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 164 days.

(21) Appl. No.: 13/938,207

(22) Filed: Jul. 9, 2013

(65) Prior Publication Data

US 2014/0077973 A1 Mar. 20, 2014

(30) Foreign Application Priority Data

Sep. 20, 2012 (TW) ............................. 101134413 A

(51) Int. Cl.
*B60Q 1/48* (2006.01)
*G08G 1/14* (2006.01)

(52) U.S. Cl.
CPC ................ *G08G 1/143* (2013.01); *G08G 1/146* (2013.01)

(58) Field of Classification Search
CPC ............................... G08G 1/143; G08G 1/146
USPC ....................................................... 340/932.2
See application file for complete search history.

(56) References Cited

U.S. PATENT DOCUMENTS

| | | | | |
|---|---|---|---|---|
| 2006/0161334 | A1 * | 7/2006 | Teramae | 701/117 |
| 2007/0146166 | A1 * | 6/2007 | Sato et al. | 340/932.2 |
| 2011/0071753 | A1 | 3/2011 | Chu et al. | |
| 2011/0106380 | A1 * | 5/2011 | Wang et al. | 701/36 |
| 2013/0265174 | A1 * | 10/2013 | Scofield et al. | 340/932.2 |

FOREIGN PATENT DOCUMENTS

| | | |
|---|---|---|
| CN | 101727754 A | 6/2010 |
| CN | 201965763 U | 9/2011 |
| CN | 102436756 A | 5/2012 |
| TW | 201111747 | 4/2011 |
| TW | 201111747 A1 | 4/2011 |

OTHER PUBLICATIONS

"How to find a parking space efficiently", ARTC monthly epaper No. 10109, Sep. 17, 2012, http://www.artc.org.tw/chinese/02_research/02_01detail.aspx?pdid=44, parts of p. 5.

"Taipei Easy Parking—New software helps to find your car", Liberty Times Net, Aug. 3, 2011, http://www.libertytimes.com.tw/2011/new/aug/3/today-taipei11.htm, parts of p. 1.

(Continued)

*Primary Examiner* — Kerri McNally
(74) *Attorney, Agent, or Firm* — Winston Hsu; Scott Margo

(57) ABSTRACT

A method of guiding a parking space for an electronic device on a vehicle is disclosed. The method includes obtaining location information of the parking space; calculating a destination position according to the location information; determining a movement of the vehicle via at least one sensor of the electronic device to generate a determination result; and generating a guiding indication for guiding the vehicle to the destination position according to the determination result and the destination position.

7 Claims, 4 Drawing Sheets

(56) References Cited

OTHER PUBLICATIONS

Office action mailed on Jun. 4, 2014 for the Taiwan application No. 101134413, filing date: Sep. 20, 2012, p. 1 line 13-14, p. 2 line 1-7 and p. 3 line 7-11 and line 18-19.

Office action mailed on Apr. 3, 2015 for the China application No. 201210372145.5, p. 3 line 4-11 and line 27-28 and p. 4 line 7-8 and line 10-13.

Office action mailed on Jul. 31, 2015 for the China application No. 201210372145.5, p. 3 line 5-30, p. 4-6 and p. 7 line 1-21.

* cited by examiner

METHOD OF GUIDING PARKING SPACE AND RELATED DEVICE

BACKGROUND OF THE INVENTION

1. Field of the Invention

The present invention relates to a method and device for guiding a parking space, and more particularly, to a method and device capable of utilizing location information and a sensor of an electronic device for guiding a parking space.

2. Description of the Prior Art

A parking space in a heavy traffic city is troublesome to a car driver. With technology advances in recent years, more and more drivers utilize the Global Positioning System (GPS) or the wireless communication system such as 3G or Wi-Fi for finding parking lots nearby.

However, after entering a parking lot, the driver usually cannot find a vacant parking space. Even if the number of vacant parking space is shown at the entrance of the parking lot, the driver still cannot know the location of the vacant parking space. When the driver is guided via a GPS, which is commonly used outdoors, poor signal reception may occur indoors, causing the positioning function of the GPS disabled. Note that, similar problems may also occur indoors when the driver uses the wireless communication system for positioning. In order to solve the abovementioned problems, base stations or mobile signal boosters have to be arranged widely.

SUMMARY OF THE INVENTION

The present invention therefore provides a method and device for guiding a parking space, which can be utilized in various environments, in order to solve the abovementioned problems.

The present invention discloses a method of guiding a parking space for an electronic device on a vehicle. The method comprises obtaining location information of the parking space; calculating a destination position according to the location information; determining a movement of the vehicle via at least one sensor of the electronic device to generate a determination result; and generating a guiding indication for guiding the vehicle to the destination position according to the determination result and the destination position.

The present invention further discloses an electronic device for a vehicle. The electronic device comprises a decoding unit, for obtaining location information of a parking space; a processing unit, for calculating a destination position according to the location information; at least one sensing unit, for determining a movement of the vehicle to generate a determination result; and an indicating unit, for generating a guiding indication for guiding the vehicle to the destination position according to the determination result and the destination position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
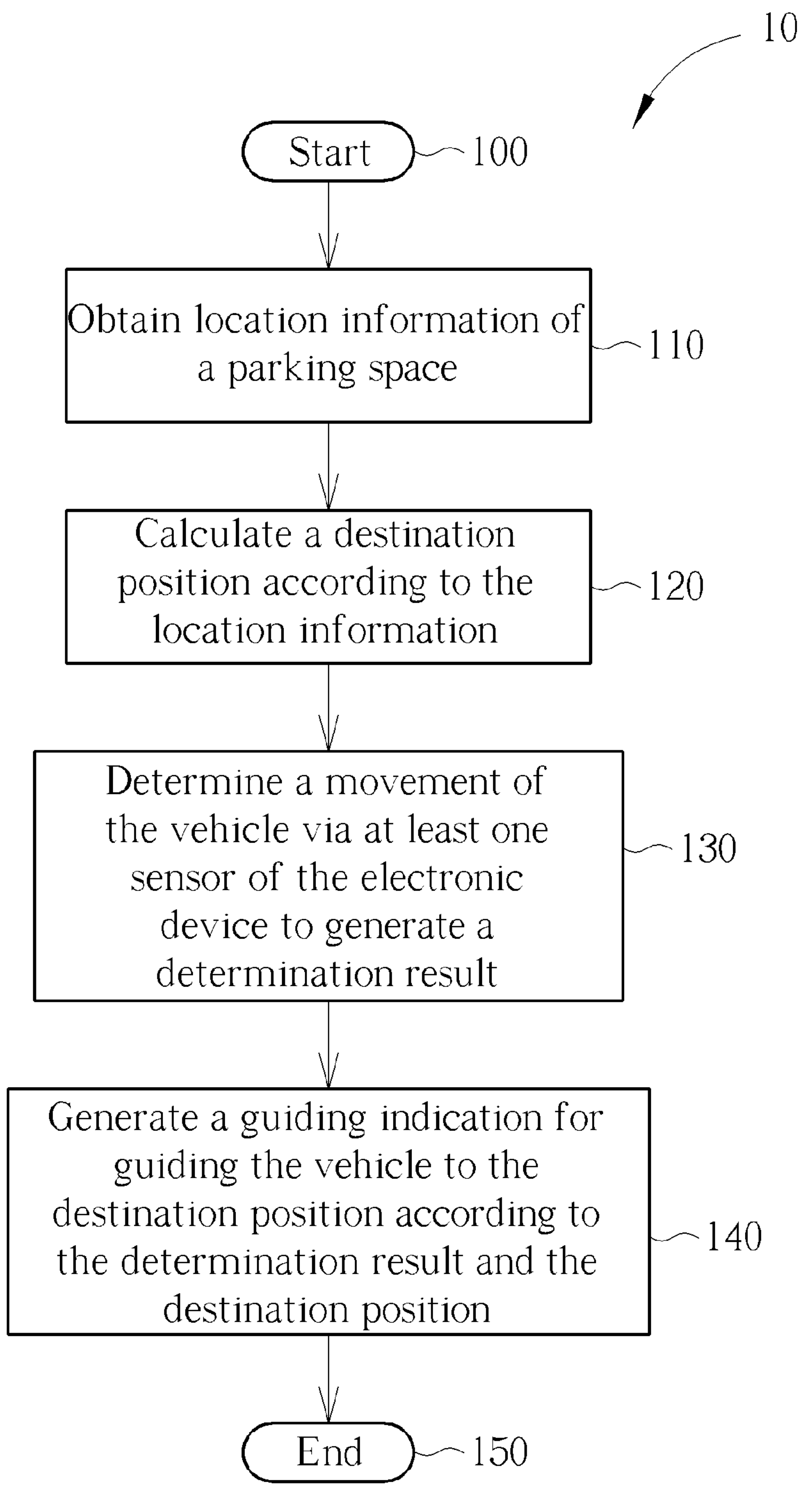
FIG. 1 is a schematic diagram of a parking space guiding process according to an embodiment of the present invention.

In order to solve the conventional problem that the GPS or the wireless communication system can not be utilized indoors for guiding the vehicle to a vacant parking space, the present invention provides a method and a device for guiding a parking space indoors, such that the driver can find the vacant parking space quickly, so as to reduce the time for finding a parking space. Please refer to FIG. 1, which is a schematic diagram of a parking space guiding process 10 according to an embodiment of the present invention. The parking space guiding process 10 is utilized for an electronic device. The electronic device can be a PDA, a tablet personal computer, a mobile telephone, a car navigation system or a vehicle computer, etc., which is not limited herein. The parking space guiding process 10 includes the following steps:

Step 100: Start.

Step 110: Obtain location information of a parking space.

Step 120: Calculate a destination position according to the location information.

Step 130: Determine a movement of the vehicle via at least one sensor of the electronic device to generate a determination result.

Step 140: Generate a guiding indication for guiding the vehicle to the destination position according to the determination result and the destination position.

Step 150: End.

According to the parking space guiding process 10, the electronic device on the vehicle obtains the location information of the parking space first, and calculates the destination position of the parking space according to the location information. The electronic device then determines a direction and distance of the movement of the vehicle via at least one sensor, in order to generate the guiding indication corresponding to the destination position according to the direction and distance of the movement of the vehicle, in order to guide the vehicle to the parking space. Please note that the location information may include data related to path, distance, parking space number and/or coordination, etc.

Figure 2:
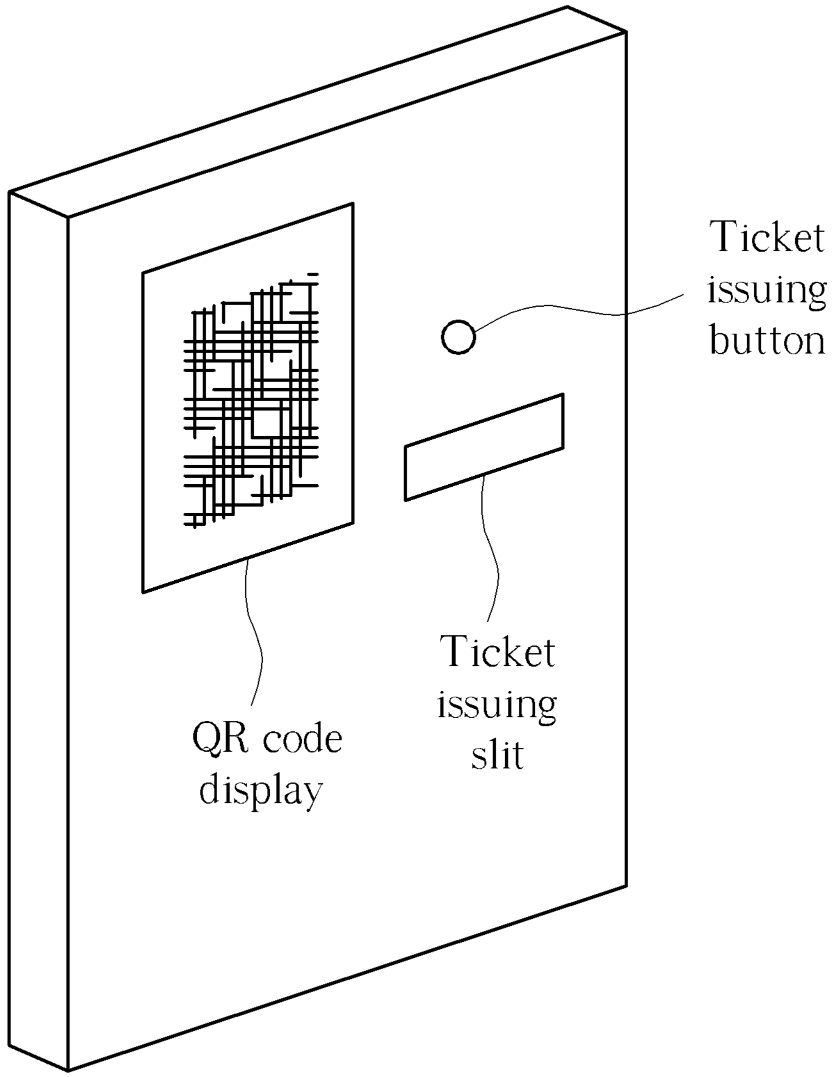
FIG. 2 is a schematic diagram of a ticket issuing machine according to an embodiment of the present invention.

For example, please refer to FIG. 2, which is a schematic diagram of a ticket issuing machine according to an embodiment of the present invention. The ticket issuing machine is set up at the entrance of the parking lot, and has a server for storing parking space information. The parking space information includes a parking space guide, and the parking space guide can be coded as a mobile barcode such as a Quick Response Code (QR Code). Please note that the mobile barcode can be displayed on the screen of the ticket issuing machine or printed on a parking ticket. After obtaining the mobile barcode, the driver can utilize related software (e.g. a QR code reader) on a mobile device (e.g. a smart phone) to scan the mobile barcode and to decode to obtain the parking space guide. After obtaining the parking space guide, the smart phone can obtain a turning angle of the vehicle via a sensor (e.g. a gyro meter), and calculate a distance of the movement of the vehicle via an acceleration sensor. Please note that, the types of sensors are not limited herein, and as long as a sensor can be utilized for detecting the movement of the vehicle, the sensor can be realized in the embodiments of the present invention. Besides, operations of the gyro meter and the acceleration sensor are well known by those skilled in the art, and the functions and characteristics of these sensors will not be narrated herein.

Figure 3:
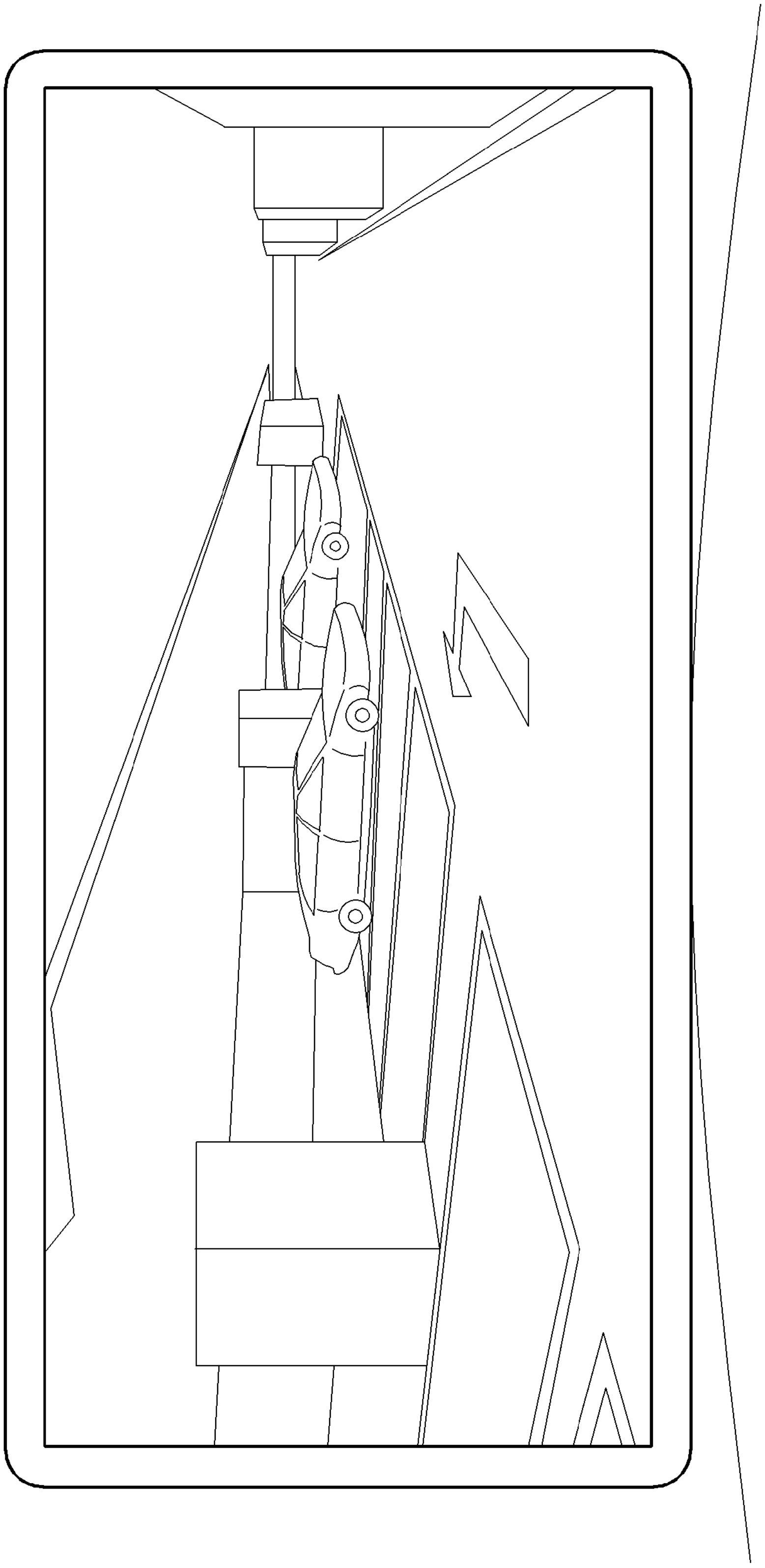
FIG. 3 is a schematic diagram of an image of modeling the parking space guiding according to an embodiment of the present invention.

In addition, please refer to FIG. 3, which is a schematic diagram of an image of modeling the parking space guiding according to an embodiment of the present invention. According to the embodiment of the present invention, after the sensor obtains the movement of the vehicle, the smart phone may generate related direction indication according to the parking space guide and the movement of the vehicle, and the direction indication is displayed on the screen of the smart phone in an augmented reality (AR) manner together with the image captured by the camera of the smart phone, such that the driver can arrive the destination position of the parking space accurately.

In short, the driver downloads the QR code assigned by the ticket issuing machine of the parking lot via the camera of the smart phone, and the location information is converted from the diagram of the QR code. The smart phone then sets the destination position according to the location information, performs guiding via the sensors, and utilizes an arrow on the screen to indicate the moving direction, in order to lead the driver to the destination. Therefore, according to the embodiment of the present invention, the purpose of guiding the vehicle to the vacant parking space can be achieved by using the application installed in the wireless communication device (e.g. the smart phone) together with the photographic function and the sensors of the smart phone. Please note that the embodiment of the present invention can be utilized indoors, which solves the problem that the conventional GPS or the wireless communication system are limited to bad reception and cannot perform the positioning and guiding functions indoors.

Figure 4:
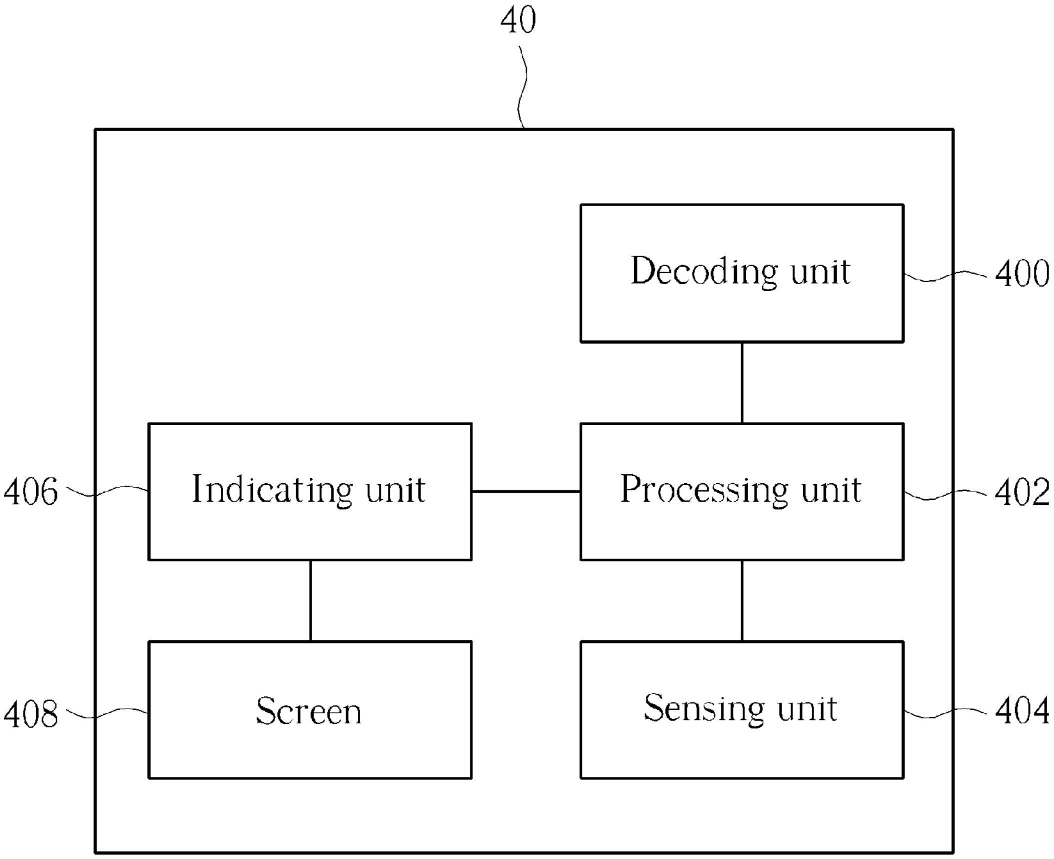
FIG. 4 is a schematic diagram of a parking space guiding device according to an embodiment of the present invention.

Those skilled in the art can realize the parking space guiding process 10 in a software or hardware manner. For example, the electronic device may include a storage unit, which can be any one of data store devices such as read-only memory (ROM), for storing data. The stored data includes a program compiled according to the parking space guiding process 10, where the program is read and processed by a processor, in order to execute and realize the steps of the parking space guiding process 10. Otherwise, please refer to FIG. 4, which is a schematic diagram of a parking space guiding device 40 according to an embodiment of the present invention. The parking space guiding device 40 can be utilized in a vehicle, for guiding parking space. As shown in FIG. 4, the parking space guiding device 40 includes a decoding unit 400, a processing unit 402, a sensing unit 404, an indicating unit 406 and a screen 408. The decoding unit 400 is utilized for obtaining location information of a parking space. The processing unit 402 is utilized for calculating a destination position according to the location information. The sensing unit 404 is utilized for determining a movement of the vehicle to generate a determination result. The indicating unit 406 is utilized for generating a guiding indication for guiding the vehicle to the destination position according to the determination result. In short, after obtaining the location information of the parking space (e.g. decoding a QR code to obtain the location information of the parking space), the decoding unit 400 may send the location information to the processing unit 402, such that the processing unit 402 can calculate the destination position of the parking space. After determining the direction and distance of the movement of the vehicle, the sensing unit 404 sends the information to the processing unit 402. The processing unit 402 then calculates the relationship between the movement of the vehicle and the destination position, and outputs an indication signal to the indicating unit 406, such that the indicating unit 406 can display the direction guiding indication corresponding to the indication signal on the screen 408. The detailed operations of the parking space guiding device 40 are illustrated above, and will not be narrated herein.

To sum up, according to the embodiment of the present invention, after the parking space information is obtained, the sensor together with the camera can guide the vehicle to the accurate location of parking space, such that the time for the driver to find the parking space can be reduce. In addition, the embodiment of the present invention can be used for solving the problem of poor signal reception indoors, so as to avoid guiding failure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of guiding a parking space for an electronic device on a vehicle, the method comprising:

obtaining location information of the parking space;

calculating a destination position according to the location information;

determining a movement of the vehicle via at least one sensor of the electronic device to generate a determination result; and generating a guiding indication for guiding the vehicle to the destination position according to the determination result and the destination position;

wherein the step of obtaining location information of the parking space comprises obtaining the location information of the parking space according to an mobile barcode, and the step of generating the guiding indication comprises generating the guiding indication on a display screen of the electronic device for guiding the vehicle to the destination position according to the determination result and the destination position, and displaying the guiding indication in an augmented reality (AR) manner via the display screen according to a real-time image related to the movement of the vehicle obtained by the electronic device.

2. The method of claim 1, wherein the location information comprises data related to path, distance, parking space number and/or coordination.

3. The method of claim 1, wherein the step of determining the movement of the vehicle via the sensor of the electronic device to generate the determination result comprises:

determining a direction and distance of the movement of the vehicle via the sensor of the vehicle; and generating the determination result according to the direction and distance of the movement of the vehicle.

4. An electronic device for a vehicle, comprising:

a decoding unit obtaining location information of a parking space according to a mobile barcode;

at least one sensing unit determining a movement of the vehicle to generate a determination result;

a processing unit calculating a destination position according to the location information received from the decoding unit, and calculating a relationship between the movement of the vehicle and the destination position according to the destination position and the determination result received from the sensing unit to generate an indication signal;

an indicating unit generating a guiding indication for guiding the vehicle to the destination position according to the indication signal received from the processing unit;

a camera obtaining a real-time image related to the movement of the vehicle; and a display screen displaying the guiding indication, wherein the display screen displays the guiding indication in an augmented reality (AR) manner according to the real-time image.

5. The electronic device of claim 4, wherein the sensing unit comprises an acceleration sensor and a gyro meter.

6. The electronic device of claim 4, wherein the location information comprises data related to path, distance, parking space number and/or coordination.

7. The electronic device of claim 4, wherein the sensing unit is utilized for determining a direction and distance of the movement of the vehicle, and generating the determination result according to the direction and distance of the movement of the vehicle.

* * * * *